United States Patent
Doxey et al.

(10) Patent No.: US 8,973,771 B2
(45) Date of Patent: Mar. 10, 2015

(54) WELDED FULL CONTACT FLOATING ROOF

(71) Applicant: HMT Inc., Tomball, TX (US)

(72) Inventors: Michael J. Doxey, Houston, TX (US); Richard P. King, Tomball, TX (US)

(73) Assignee: HMT LLC, The Woodlands, TX (US)

( * ) Notice: Subject to any disclaimer, the term of this patent is extended or adjusted under 35 U.S.C. 154(b) by 0 days.

(21) Appl. No.: 13/929,191

(22) Filed: Jun. 27, 2013

(65) Prior Publication Data
US 2013/0284740 A1    Oct. 31, 2013

Related U.S. Application Data

(63) Continuation of application No. 12/075,229, filed on Mar. 6, 2008, now abandoned.

(51) Int. Cl.
*B65D 88/34* (2006.01)
*B23K 31/02* (2006.01)

(52) U.S. Cl.
CPC ............... *B65D 88/34* (2013.01); *B23K 31/02* (2013.01); *B23K 2201/12* (2013.01)
USPC ........... 220/216; 220/222; 220/227; 220/578; 52/588.1; 52/650.3; 29/897.32

(58) Field of Classification Search
CPC ...... B65D 88/34; B65D 81/245; B23K 33/00; B23K 33/008; E04B 7/14; E04B 7/16; E04B 9/06; E04B 9/22; B21D 53/00; E04H 7/065; E04F 15/02447; E04F 15/02452; E04F 15/02458
USPC ....... 52/582.1, 650.3, 795.1, 588.1; 403/270–272, 167, 168; 220/216, 218, 220/220, 222, 578; 29/897, 428, 429, 430, 29/431, 521, 530, 897.32; 228/101, 135, 228/139
See application file for complete search history.

(56) References Cited

U.S. PATENT DOCUMENTS

| | | | | |
|---|---|---|---|---|
| 2,987,215 A * | 6/1961 | Joor, II | ............................ | 220/224 |
| 4,202,460 A * | 5/1980 | Imbeault | ....................... | 220/218 |
| 5,140,913 A * | 8/1992 | Takeichi et al. | ............... | 105/397 |
| 5,704,509 A * | 1/1998 | Rosenkrantz | .................. | 220/216 |
| 6,581,819 B1 * | 6/2003 | Aota et al. | .................. | 228/112.1 |

* cited by examiner

*Primary Examiner* — Sarang Afzali
(74) *Attorney, Agent, or Firm* — Fletcher Yoder, P.C.

(57) ABSTRACT

A sealed floating roof for a storage tank, comprising a frame and roof panels, in which the frame provides a guide for directing an automatic welder along said structure to allow for automated welding of the roof panels to the frame, and a method of forming such a roof.

12 Claims, 5 Drawing Sheets

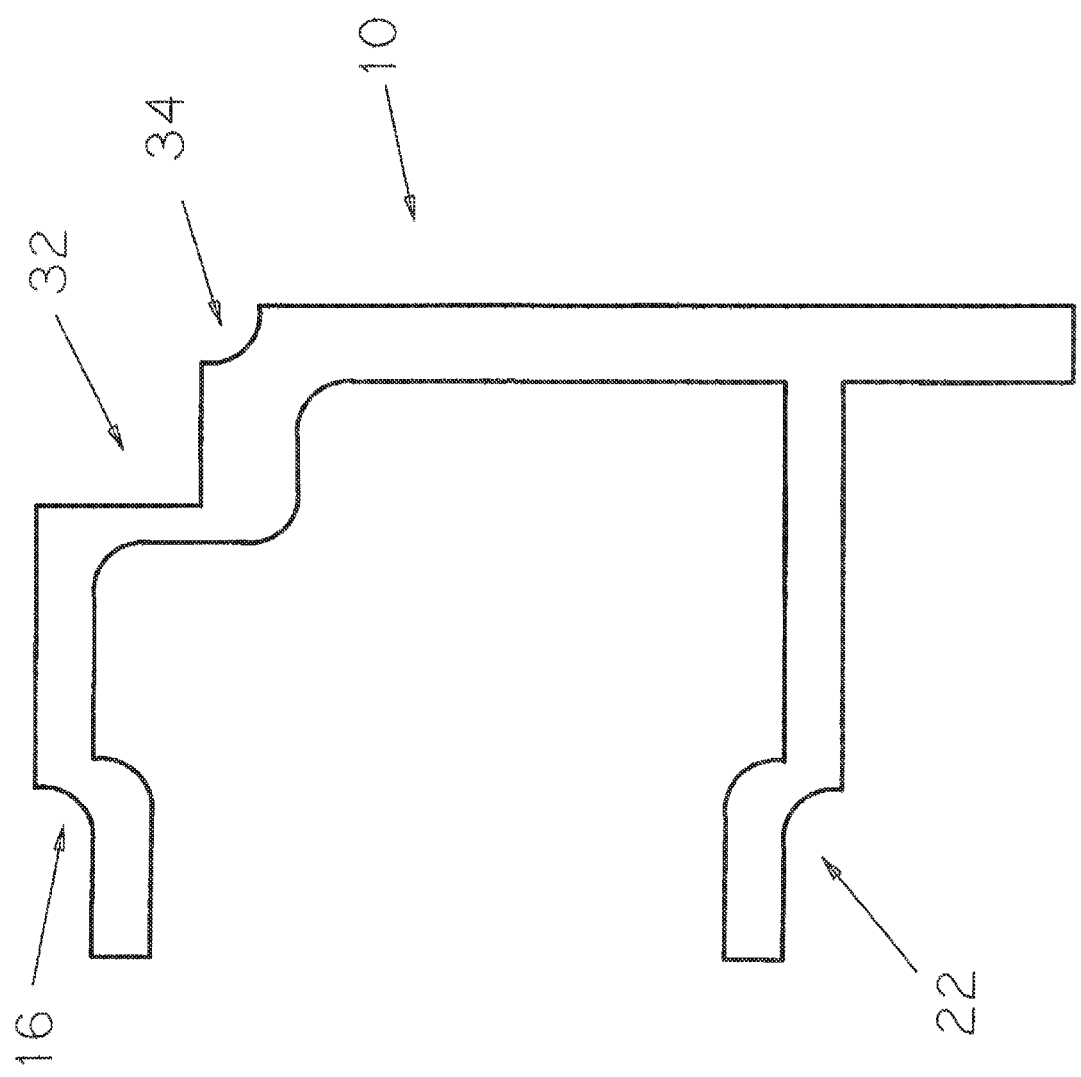

WELDED FULL CONTACT FLOATING ROOF

CROSS-REFERENCE TO RELATED APPLICATIONS

This application is a continuation of U.S. patent application Ser. No. 12/075,229, entitled "WELDED FULL CONTACT FLOATING ROOF AND METHOD", filed Mar. 6, 2008, which is herein incorporated by reference in its entirety.

BACKGROUND

The invention pertains to sealed floating roofs for storage tanks

Above ground storage tanks are frequently used to store hydrocarbon fluids. Because the stored fluid is volatile, the storage tank is often equipped with a floating roof itself sometimes under a fixed roof. The floating roof floats on the stored fluid and moves up and down with the fluid level. Floating roofs greatly reduce fluid evaporation, preventing loss of the stored fluid and reducing pollution due to hydrocarbon evaporation into the atmosphere.

Additionally, it is desirable to provide floating roofs that are full-contact roofs, allowing the roof structure to be in direct contact with the fluid surface. Such roofs do not allow an air gap between the bottom of the roof surface and contained fluid. When air gaps exist, they allow an evaporation zone over the top of the fluid that increases the risk of leakage around the floating roof structure. However, full contact floating roofs must be tightly sealed to prevent direct vapor leakage or evaporation through small gaps in the roof structure. Such leakage or evaporative losses can create unwanted pollution as well as the economic loss of stored product.

However, typical floating roofs are large and must be assembled on site. The structure typically comprises a framework of segments that are assembled to form and open lattice, and a plurality of roof panels or sheets that are then attached to the framework to form the upper surface of the roof. Roof panels or sheets are typically attached by bolting them in place, and sometimes sealed with sealants that are generally known in the industry.

Such construction can prevent the desired sealing effectiveness of the roof from being achieved. Sealants can degrade over time due to environmental conditions, and may be attacked by contact with the stored fluid or by vapors. Bolted connections are not vapor tight. Effecting repairs can require draining the storage tank, resulting in lost revenue, and may require workers to operate in a hazardous environment. Accordingly it is desirable to provide a seal between the roof panels and the framework that is highly resistant to degradation over time, and that will provide a strong, durable roof over its life expectancy.

One possible approach is to weld the edges of the roof panels to the framework, so that every seam between the roof panels and the framework is permanently sealed. However, if welding were to be done by hand, the large size of the typical floating roof would require a large expenditure of man hours, and the work would often have to be done in an extremely uncomfortable environment.

Accordingly, it is desirable to provide a floating roof, especially one intended for full contact, with welded construction so that the roof panels are welded to the framework. It is further desirable to accomplish this welding with an automatic welder.

SUMMARY

The invention comprises a floating roof comprising frame segments and roof panel top and bottom sheets that are shop welded to the frame segments to form fully sealed roof panels. These roof panels are then assembled and welded together in the storage tank to form a fully welded, full contact floating roof. In a preferred embodiment, the frame segments are aluminum extrusions, which allow strong, yet relatively lightweight construction and high resistance to corrosion over time. Individual, fully welded roof panels may be constructed and pre-tested at a factory location, then shipped to the job site for final assembly. It is generally desirable to assemble the roof panels into a staggered rectangular grid. In this manner, standard-sized rectangular roof panels may be used to complete almost the entire roof, with differently shaped panels only required to form the outer, circular circumference of the roof.

For example, a typical rectangular panel of a preferred embodiment of the invention would be framed using four lengths of an extruded aluminum frame segment, with top and bottom sheets edge-welded around their entire perimeters to the frame segments, forming a fully sealed roof panel. These roof panels can then be tested at the factory for seal and weld integrity, and modified as desired for a particular installation. For example, sniffers or other test equipment may be inserted into a panel through its top sheet, allowing a customer to operate real-time test equipment once the roof is placed in operation. The completed roof panels may then be shipped to the job site for assembly.

Once at the job site, the roof panels may be supported on legs or temporary supports, and frame segments of adjacent panels riveted together, preferably using a self-piercing rivet gun such as Model #ESN50. Those of skill in the art will recognize that, during this assembly process, the roof panels must be supported in a way that insures that they are properly leveled with respect to each other. Once the roof panels have been riveted together to form the overall roof structure, the roof structure is completed by welding the roof panels together.

To weld the roof panels together, a self-propelled automatic welder, such as Model #BUGHDT1010 by HMT, Inc., using components manufactured by Bug-O Systems and Lincoln Welding Equipment may be used. However, it is necessary to properly guide the welder so that the track of the weld is correctly positioned along the contact seam between the adjacent roof panels. Accordingly, it is desirable to provide a guide to correctly position the automatic welder.

To accomplish this goal, the frame segments are preferably extruded with a formed depression in an upper edge of the frame segment. Due to the nature of the construction, a single form of frame segment may be used, leaving a flat side turned outward from the roof panels. When the roof panels are riveted together, these flat sides form the outer wall of the roof panel, and are riveted to the flat sides of the adjacent roof panels' frame segments, with two such frame segments mechanically coupled "back-to-back." When correctly positioned, the depressions in the upper edges of two such joined segments will be adjacent, and will form a walled trough in the upper surface of the beam.

As those of skill in the art will recognize, many alternatives to such construction may exist. For example, an entire beam could be extruded as a single piece, with a depression formed in its upper surface, without departing from the spirit of the invention. However, such an extrusion would be heavier and harder to position and control during assembly of the roof. Further, such a construction method would essentially require top and bottom sheets of the roof panels to be welded into place at the job site, increasing the complexity of the on-site construction, and making testing of individual cells in the roof much more difficult.

With a roof thus assembled, each walled trough between roof panels acts as a directional guide for the automatic welder, and an automatic welder thus controlled will maintain an appropriate path. It is therefore desirable to modify the aforementioned stock automatic welder by attaching a guide wheel to its carriage to insure that it follows the guide track in the upper surface of the framework. In a preferred embodiment, guide wheels are attached to both the front and rear of the automatic welder's carriage, to insure that one end does not skew during transit.

Completion of the floating roof can thus be accomplished by positioning the automatic welder to transit along the walled troughs, using the walls for guidance and forming a continuous welding bead in the trough. Those of skill in the art will recognize that, without departing from the spirit of the invention, guidance of the automatic welder may be accomplished by a variety of alternate methods, such as providing multiple parallel troughs for guide wheels, radio or light frequency remote controls, direct linkage remote controls, or computer driven programmable controls integrated into the welder itself. While functional, such alternatives may increase the complexity of the assembly operation.

BRIEF DESCRIPTION OF THE DRAWINGS

FIG. 1A is a cross section of a frame segment extrusion of one embodiment of the present invention;

DETAILED DESCRIPTION OF THE INVENTION

Figure 1B:
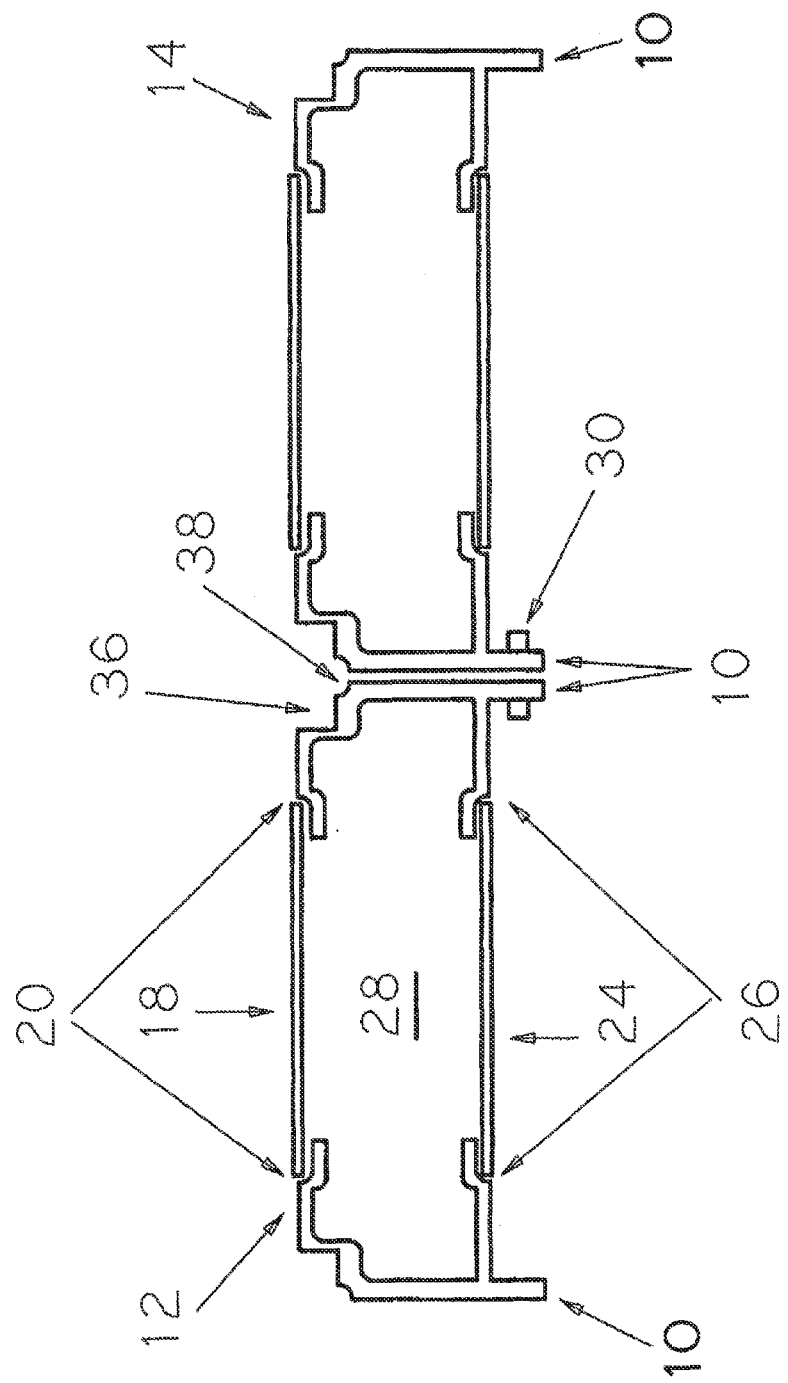
FIG. 1B is a cross section of two adjacent roof panels of one embodiment of the present invention.

Referring to FIG. 1A, an extruded frame segment 10 of a preferred embodiment of the present invention is seen in cross-section. Referring also to FIG. 1B, a cross-section of two adjacent assembled roof panels 12, 14 employing multiple frame segments 10 is shown. Frame segments 10 of FIGS. 1A, 1B comprises an upper lip 16 which supports upper roof sheet 18 and which is placed into sealing contact with upper roof sheet 18 by welding along the perimeter 20 of upper roof sheet 18. Similarly, frame segment 10 comprises a lower lip 22 that is placed into sealing contact with lower roof sheet 24 by welding along the perimeter 26 of lower roof sheet 24. When so assembled, frame segments 10 and upper and lower roof sheets 18, 24 form a sealed cavity 28 that forms a component of a full contact floating roof.

Figure 4:
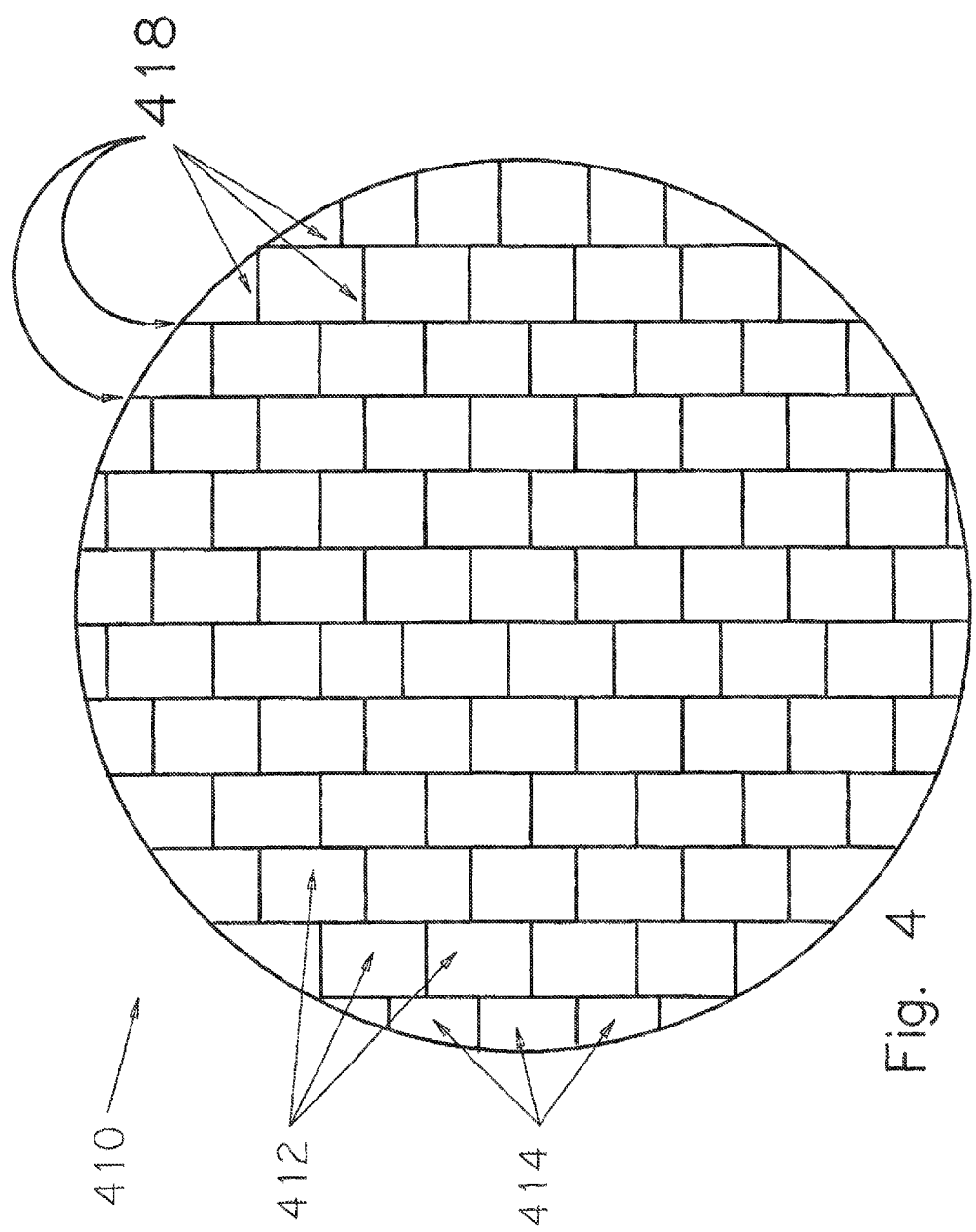
FIG. 4 is a schematic view of an assembled full contact floating roof of one embodiment of the present invention.

Roof panels 12, 14 are preferably constructed and initially tested at a factory before being shipped to a job site for assembly into a full contact floating roof (Such as depicted in FIG. 4) When placed adjacent to each other for assembly into a roof, roof panels 12, 14 are first leveled and properly aligned, then mechanically joined together, as by use of stainless steel rivets 30.

Frame segment 10 additionally preferably comprises a first top depression 32 and a second top depression 34. When joined in complementary orientation, as shown in FIG. 1B, the first top depressions 32 of two frame segments 10 combine to form a walled trough 36. Similarly, the second top depressions 34 combine to form a weld seam 38.

Figures 2A, 2B:
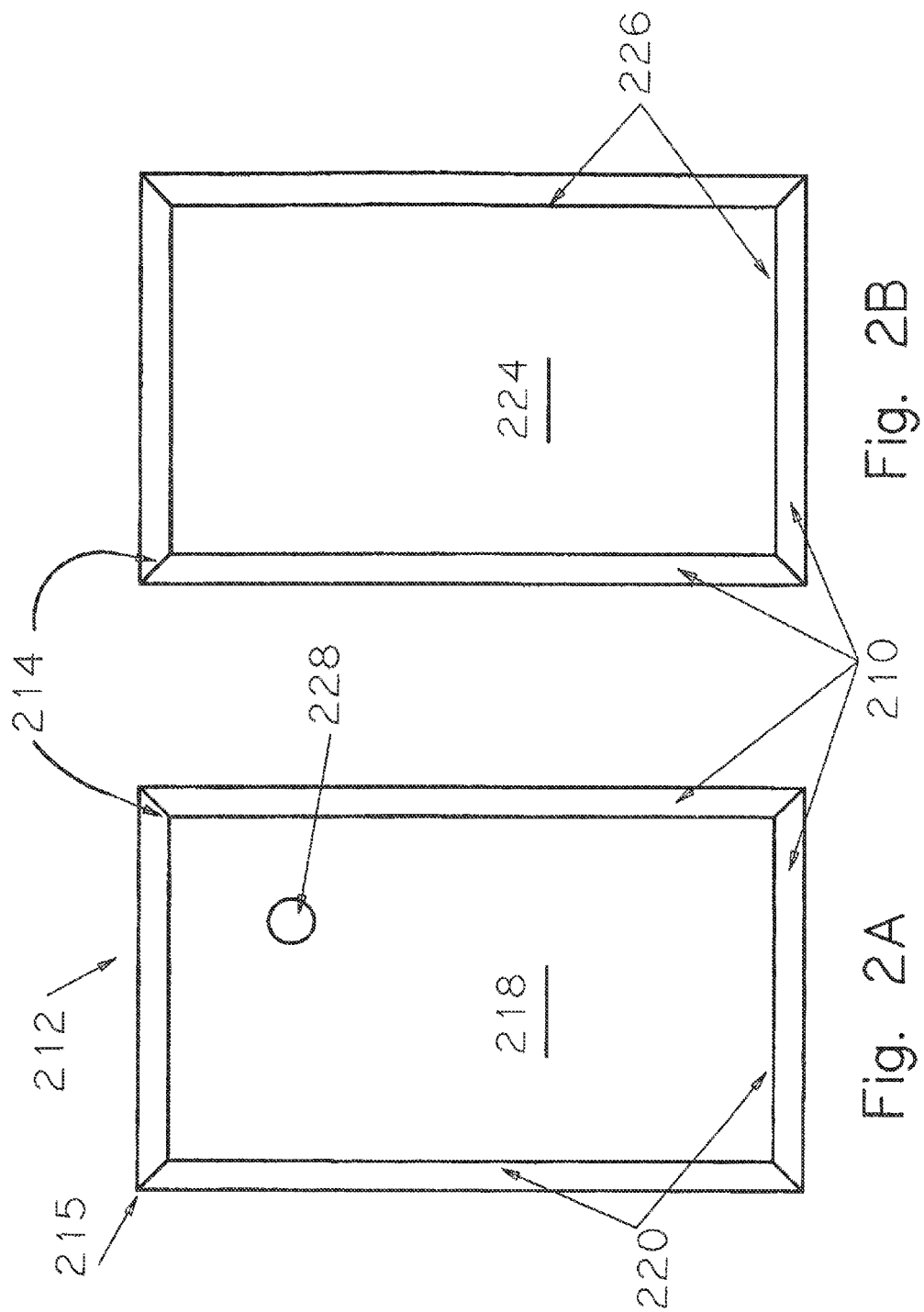
FIG. 2A is a top view of a roof panel of one embodiment of the present invention.
FIG. 2B is a bottom view of a roof panel of one embodiment of the present invention.

Referring now to FIGS. 2A and 2B, top and bottom views of assembled roof panels 212 are shown respectively. Frame segments 210 are angle-cut at the corners to provide squared-off corners 215. Upper roof sheet 218 is fully welded to frame segments 210 along its perimeter 220, and lower roof sheet 224 is fully welded to frame segments 224 along its perimeter 226. Frame segments 210 are also welded at corners 214 to provide a completely sealed roof panel. Although roof panels 212 are preferably rectangular in shape, those of skill in the art will recognize that this shape is a matter of engineering preference, and that panels with curved edges will be required to form the perimeter of a circular floating roof as shown in FIG. 4. If desired, one or more portals 228 may be opened in the upper roof sheet 218, to provide access to the interior of the roof panel 212 for the insertion of leak sniffers or other instrumentation.

Figure 3:
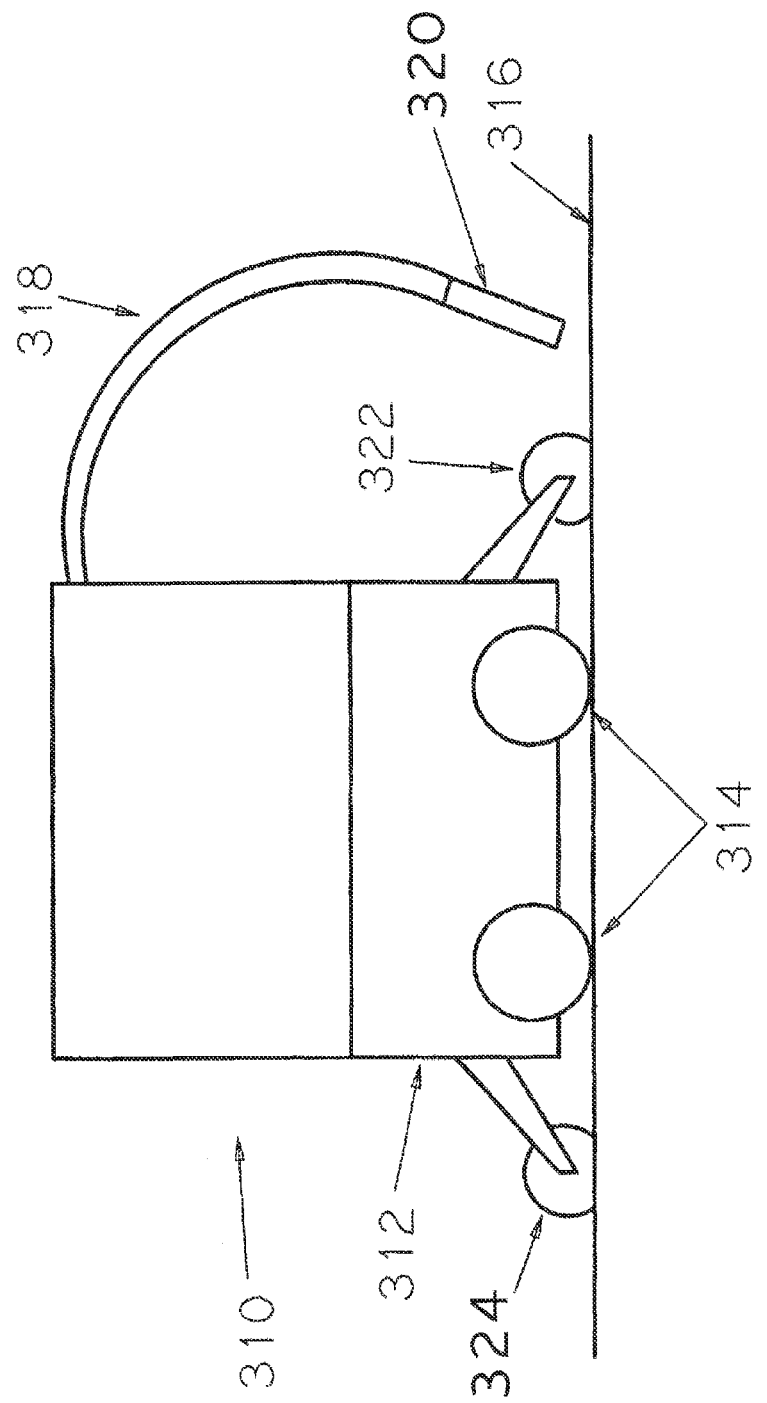
FIG. 3 is a side schematic view of an automatic welder operating to weld roof panels together in an assembled roof.

Referring now to FIG. 3, a schematic view of an automatic welder 310 for use in completion of the floating roof is shown. The automatic welder 310 comprises a carriage 312 mounted on wheels 314, allowing it to roll across the upper surface 316 of the floating roof. A weld head 320 is held in position by control arm 318, allowing weld head 320 to be positioned to form a weld along weld seam 38 of FIG. 1B. Guide wheels 322, 324 are attached to the automatic welder 310, and are fitted into walled trough 36 of FIG. 1B, controlling the line of motion of the automatic welder 310, and allowing the automatic welder 310 to track each weld seam in the floating roof under assembly to completely seal the roof.

Those of skill in the art will recognize that other means of guiding the automatic welder, such as (without limitation) radio frequency controls, directly connected steering controls, or alternate guide lines formed in the roof under construction could be used without departing from the spirit of the invention. Additionally, guidance could be accomplished without using multiple guide wheels.

Referring now to FIG. 4, a schematic top view of a welded, full contact floating roof of the present invention is shown. Floating roof 410 preferably comprises a plurality of rectangular roof panels 412 and perimeter curved roof panels 414. Those of skill in the art will recognize that panels 412 and 414 are constructed in the same fashion, with curved panels 414 requiring curved frame segments along one side. Further, if the floating roof is of square or rectangular configuration, curved roof panels will be unnecessary.

One or more panels, for example 416, may be provided with man-way access, to allow personnel to access the lower portion of the roof if needed. Each of the seams 418 between adjacent roof panels 412, 414 is welded by use of the automatic welder as discussed above, providing a full contact floating roof that is fully sealed against evaporation by welds.

Those of skill in the art will also recognize that the floating roof of this invention may be fitted with a sliding edge seal (not shown) around its perimeter as known in the art. Additionally, the roof may be equipped to be held at a particular height, for example, for maintenance operations, by providing it with non-penetrating cable attach points (non-shown) on its upper surface, or by providing non-penetrating leg supports (not shown) on its lower surface. Thus, these attachments can be made without penetrating the roof, preserving its sealing integrity.

The above examples are included for demonstration purposes only and not as limitations on the scope of the invention. Other variations in the construction of the invention may be made without departing from the spirit of the invention, and those of skill in the art will recognize that these descriptions are provide by way of example only.

The invention claimed is:

1. A roof panel of a sealed floating roof for a storage tank, comprising:
 a first frame segment and a second frame segment, wherein each of the first and second frame segments comprises a first top depression configured to abut an adjacent top depression of a respective frame segment of a respective adjacent roof panel to form a walled trough to guide an automatic welder along a weld joint during a welding process; and
 a first panel sheet and a second panel sheet, wherein the first panel sheet is supported by a respective upper lip of each of the first and second frame segments, and the second panel sheet is supported by a respective lower lip of each of the first and second frame segments and wherein each of the first and second panel sheets are coupled to each of the first and second frame segments to form the roof panel.

2. The roof panel of claim 1, wherein the first and second frame segments and the first and second panel sheets form a sealed cavity.

3. The roof panel of claim 1, wherein the first panel sheet or the second panel sheet comprises an aperture configured to provide access to a sealed cavity formed in the roof panel.

4. The roof panel of claim 1, wherein each of the first and second panel sheets comprises a rectangular shape.

5. The roof panel of claim 1, wherein the first and second frame segments are configured to mechanically couple to adjacent respective frame segments of adjacent respective roof panels before the welding process.

6. The roof panel of claim 1, wherein the walled trough is configured to retain and guide the automatic welder along the weld joint during the welding process.

7. The roof panel of claim 1, wherein the top depression comprises two surfaces generally orthogonal to one another.

8. A sealed floating roof for a storage tank, comprising:
 a plurality of roof panels positioned adjacent to one another, wherein each of the plurality of roof panels comprises:
 a first frame segment and a second frame segment, wherein each of the first and second frame segments comprises a top surface depression configured to guide a self-propelled automatic welder along a weld joint between adjacent roof panels during assembly of the sealed floating roof; and
 a first panel sheet and a second panel sheet, wherein the first panel sheet is supported by a respective upper lip of each of the first and second frame segments, and the second panel sheet is supported by a respective lower lip of each of the first and second frame segments and wherein each of the first and second panel sheets are coupled to each of the first and second frame segments to form the respective roof panel.

9. The sealed floating roof of claim 8, wherein the top surface depression of each of adjacent roof panels abut one another to form a walled trough configured to guide the self-propelled automatic welder along the weld joint.

10. The sealed floating roof of claim 8, wherein the plurality of roof panels comprises a first plurality of roof panels and a second plurality of roof panels, wherein each of the first plurality of roof panels comprises a rectangular shape and each of the second plurality of roof panels comprises a non-rectangular shape.

11. The sealed floating roof of claim 8, wherein each of the plurality of roof panels comprises a sealed cavity defined by the respective first and second frame segments and the first and second panel sheets of each of the plurality of roof panels.

12. The sealed floating roof of claim 8, wherein the first and second frame segments of each of the plurality of roof panels are mechanically coupled to first or second frame segments of adjacent roof panels.

* * * * *